(12) United States Patent
Matthews

(10) Patent No.: US 7,065,254 B2
(45) Date of Patent: Jun. 20, 2006

(54) MULTILAYERED IMAGE FILE

(75) Inventor: Kristine E. Matthews, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 635 days.

(21) Appl. No.: 09/952,644

(22) Filed: Sep. 13, 2001

(65) Prior Publication Data

US 2003/0048954 A1    Mar. 13, 2003

(51) Int. Cl.
G06K 9/36    (2006.01)

(52) U.S. Cl. .................... 382/240; 382/232

(58) Field of Classification Search ........ 382/162–167, 382/176, 282, 232–255; 358/537–539; 375/240.18, 375/240.19
See application file for complete search history.

(56) References Cited

U.S. PATENT DOCUMENTS

| | | | |
|---|---|---|---|
| 4,590,606 A | 5/1986 | Rohrer | 382/137 |
| 5,392,362 A | 2/1995 | Kimura et al. | 382/176 |
| 5,748,780 A | 5/1998 | Stolfo | 382/232 |
| 5,778,092 A | 7/1998 | MacLeod et al. | 382/176 |
| 5,999,710 A | 12/1999 | Smith et al. | 358/1.15 |
| 6,512,596 B1 * | 1/2003 | Lapstun | 358/1.9 |

OTHER PUBLICATIONS

Bottou, et. al., "Lossy Compression of Partially Masked Still Images, " p. 528, © 1998 IEEE.
Bottou, et. al., "High Qaulity Document Image Compression with DjVu," Jul. 13, 1998.
Haffner, et. al., "Color Documents on the Web with DjVu," 1999 IEEE ICIP Procedings, Kobe, Japan Oct. 1999.
Huttenlocher, etl, al., "Digipaper: A Versatile Color Document Image Representation, " 1999 IEEE ICIP Proceedings in Kobe, Japan, Oct. 1999.
Queiroz, "Compression of Compound Documents, " Oct. 24-25 1999 IEEE ICIP Proceedings, Kobe, Japan.
Telecommunication Standardization Sector Study 1997-2000, full copy of "Mixed Raster Content (MRC)," pp. 7-41 and introduction pages to article.

* cited by examiner

Primary Examiner—Duy M. Dang
(74) Attorney, Agent, or Firm—Chernoff, Vilhauer, McClung & Stenzel

(57) ABSTRACT

To improve compression efficiency and decompressed image quality, images are decomposed into separate layers each containing a limited number of image element types (text, line art, or photographic). Each layer can then be compressed separately with a process that is optimal for the type of image element included in the layer. Images are decomposed into foreground, background, and mask layers. The value of a pixel in the mask layer designates whether the spatially corresponding pixel of the recomposed image will be selected from the spatially corresponding pixels of either the foreground or the background layer.

23 Claims, 4 Drawing Sheets

MULTILAYERED IMAGE FILE

BACKGROUND OF THE INVENTION

The present invention relates to layered decomposition of images.

The large size of digital data files required to represent images, makes data compression an imperative when storing or transmitting images. On the other hand, compression can be problematic because many images comprise a combination of text, line-art graphics elements, and photographic elements and compression processes are commonly designed to be more effective with one type of image element than another. For example, the JPEG (Joint Photographic Experts Group) standard (ISO 10918) is designed to effectively compress the complex multi-color matrix of photographic elements. Annoying artifacts can appear in decompressed images, especially in the vicinity of sharp transitions which are common characteristics of graphical and textual elements. On the other hand, the compression process of the JBIG (Joint Bilevel Image Group) standard (ISO/IEC 11544:1993) utilizes arithmetic encoding and is particularly effective in compressing text and graphics but less effective in compressing natural photographic elements.

One method for improving the efficiency and results of image compression decomposes compound images into layers containing a type or types of elements that are effectively compressed using a single process. The data of each layer is then compressed with a process that is particularly effective with the type of data contained in the layer. The DRAFT ITU-T RECOMMENDATION T.44 "MIXED RASTER CONTENT (MRC)," International Telecommunication Union (ITU), Telecommunication Standardization Sector, October 1997, incorporated herein by reference, specifies the technical features of an imaging format based on segmentation of images or pages into multiple layers (planes) according to the type of image element and the application of encoding, spatial and color resolution processing specific to the type of image element comprising the layer. The ITU recommendation models a page or image as three layers; a background layer containing contone color (continuous tone and palletized color) element; a foreground layer containing text and line-art graphics, and a bi-level mask layer defining a relationship between the background and foreground layers. The mask is used to select the layer (background or foreground) from which a pixel will be rendered in the recomposed image. The pixels of the mask layer act as a bi-level switch to select a spatially corresponding pixel in the foreground layer or background layer. For example, if an exemplary mask layer pixel has a value of "1," a spatially corresponding pixel might be selected from the background layer for rendering in the final image. However, if the mask layer pixel has a value of "0" the corresponding pixel would be selected from the foreground layer. While the ITU recommendation provides for processing, interchange, and archiving images in multiple layers, it does not provide a method of generating a mask layer to facilitate layered decomposition of an image.

L. Bottou et al. describe a mask generation method in HIGH QUALITY DOCUMENT COMPRESSION WITH "DjVu", JOURNAL OF ELECTRONIC IMAGING, Vol. 7, pp 410–425, 1998. An image is partitioned into square blocks of pixels of different sizes. Two dominant colors are identified for the pixels of each block. Cluster initialization is inherited from the previous, lower resolution (larger) block size. The pixels of each block are sorted into clusters according to the closeness of their individual colors to one of the dominant colors of the block. An iterative, k-means algorithm is used to sort the pixels for clustering. The iterative nature of the process increases the computational resources and the processing time required for mask creation.

D. Huttenlocher et al. describe a decomposition process in DIGIPAPER: A VERSATILE COLOR DOCUMENT IMAGE REPRESENTATION, Proceedings of the IEEE, International Conference on Image Processing, Kobe, Japan, Oct. 24–25, 1999. The process utilizes token compression where a binary image is represented using a dictionary of token shapes and position information indicating where the token is to be drawn in the image. Segmentation of the image relies on attributes of text including the token representation of text as objects. As a result, the method is more effective with text than graphics.

What is desired, therefore, is method of layered image decomposition that is resource and time conservative.

DETAILED DESCRIPTION OF THE PREFERRED EMBODIMENT

Figure 1A:
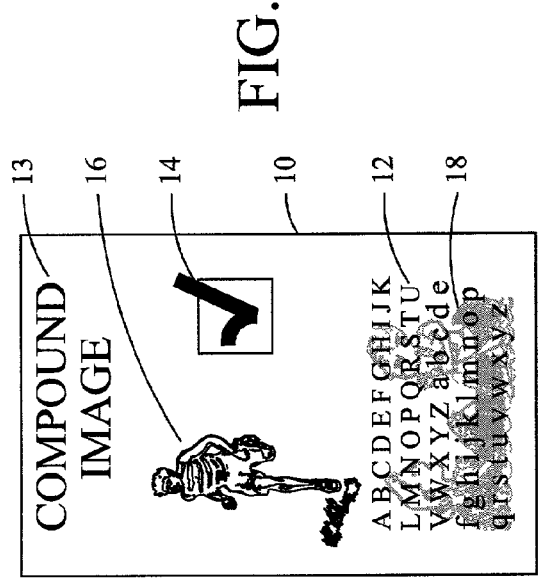
FIG. 1A illustrates a compound image including image elements of differing types.
Figure 1B:
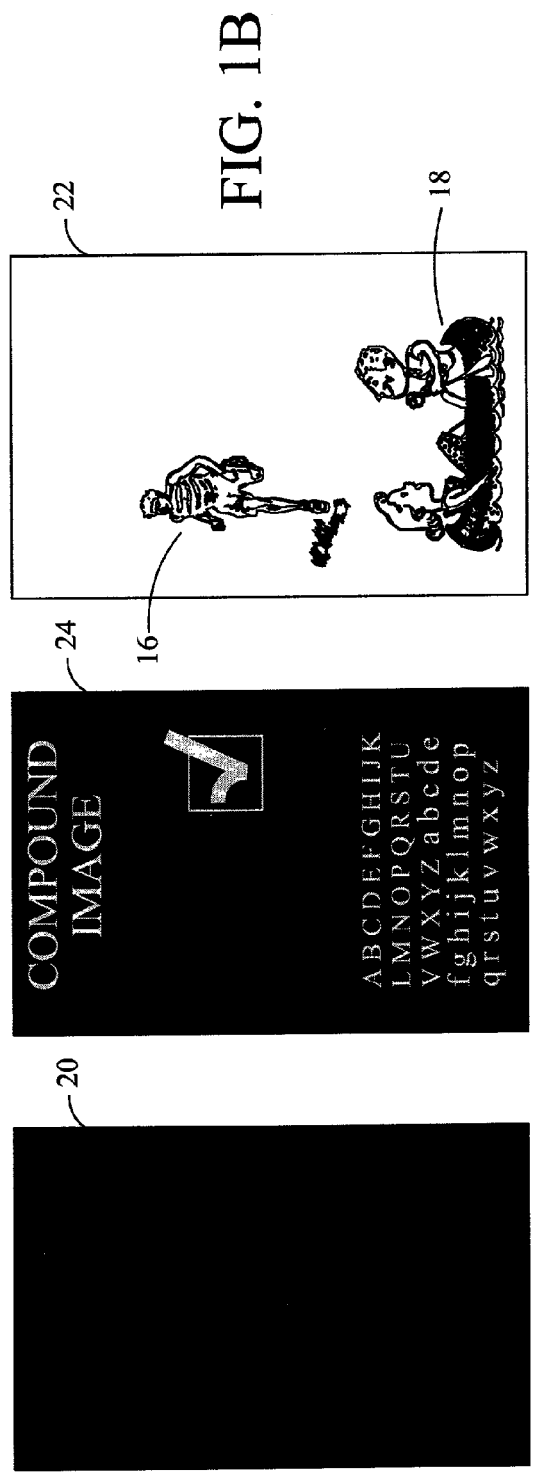
FIG. 1B illustrates a layered decomposition of the image of FIG. 1A into foreground, background, and mask layers.

A compound page or image 10 comprising textual 12 and 13, line-art or graphic 14, and photographic 16 and 18 elements is illustrated in FIG. 1A. For purposes of data storage and transmission, it is desired to decompose the image 10 into layers, each layer containing one or more specific types of image element. For example, text 12 or 13 and graphics 14 might be included in a foreground layer 20 while photographic elements 16 and 18 are included in a background layer 22 as illustrated in FIG. 1B. When the image 10 is recomposed and rendered, each pixel of the recomposed image will be selected from one of the spatially corresponding pixels of either the foreground 20 or background 22 layer as determined by a bi-level switch in the form of the value taken by a spatially corresponding pixel of a mask layer 24 selecting between the foreground 20 and background 22 layers. For example, if a pixel at a particular spatial location in the mask 24 is represented as a digital "1"(white), the color of the spatially corresponding pixel in the final image would correspond to the color of the spatially corresponding pixel in the foreground layer 20. On the other hand, if the mask pixel is a "0" (black), the color of the pixel for the final image would be selected from the other layer, the background 22. The creation of a mask 24 is an essential part of a layered decomposition of an image. The foreground layer 20 may contain multiple colors, if desired.

Figure 2:
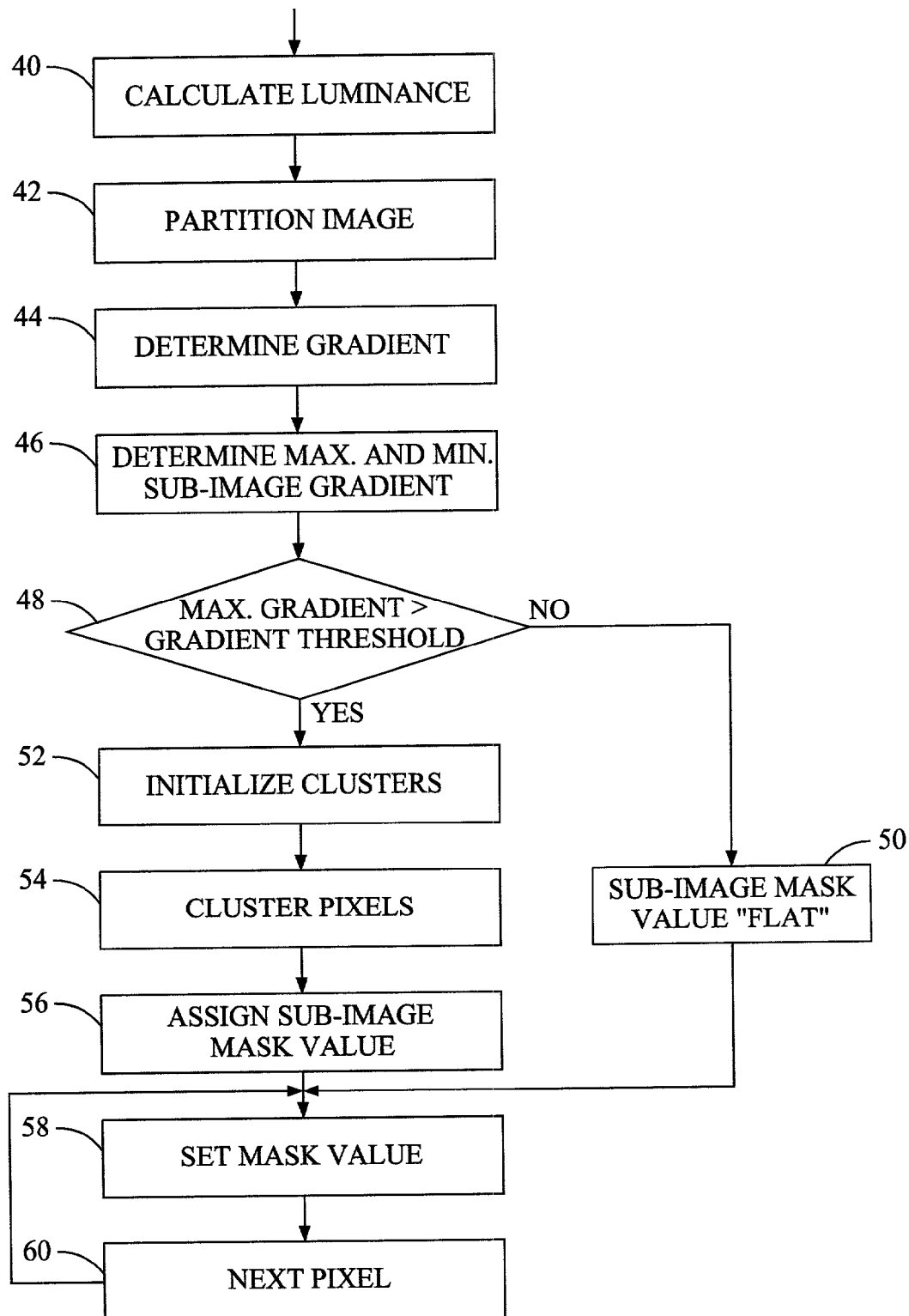
FIG. 2 is a block diagram of the mask generation method.

One example of the mask mask creation steps are illustrated in FIG. 2. Initially, a luminance representation of each of the pixels of the image is determined 40. The Y channel of the YUV color space, the Y' channel of the Y'CbCr color space, the Y component of the Commission Internationale de L'Éclairage (CIE) XYZ color space and the L-channel of the CIE L*a*b* color difference formula are suitable representations of the luminance for the present method. If the image is represented in a color space that does not provide a luminance channel then the luminance can be calculated. For example, luminance can determined for pixels in the RGB (red, green, blue) color space by application of a transform utilizing tristimulus values. While luminance is a convenient attribute of a pixel, other attributes may be used.

Figure 3:
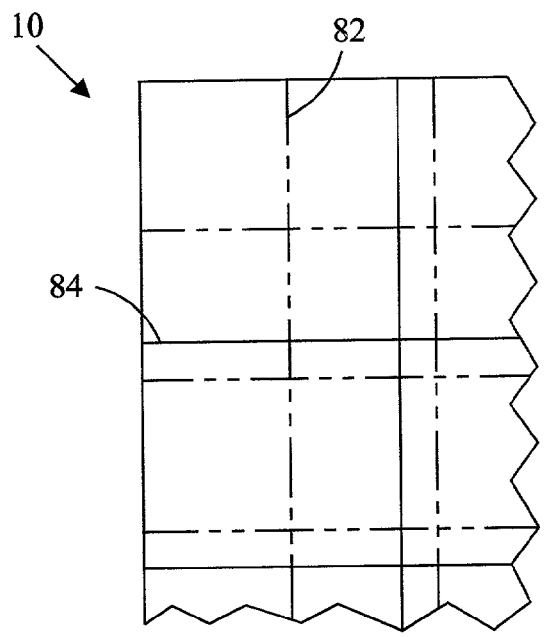
FIG. 3 illustrates partitioning of a portion of an image into mutually exclusive sub-images of two sizes.

In a second step, the image is spatially partitioned 42. Referring to FIG. 3, the image 10 is partitioned into two sets of mutually exclusive, sub-images of differing dimensions. Sub-images in the form of square blocks with a smaller block 82 ($B_S \times B_S$ in dimension) and a larger block 84 ($B_L \times B_L$ in dimension) are illustrated. The dimensions of the blocks ($B_S$ and $B_L$) are arbitrary. Each pixel is a member of a smaller and a larger sub-image. While square sub-images can be used, the image could be partitioned into sub-images having shapes other than square. A sub-image mask is produced for each of the sub-images of each size in the image 10.

Figure 4:
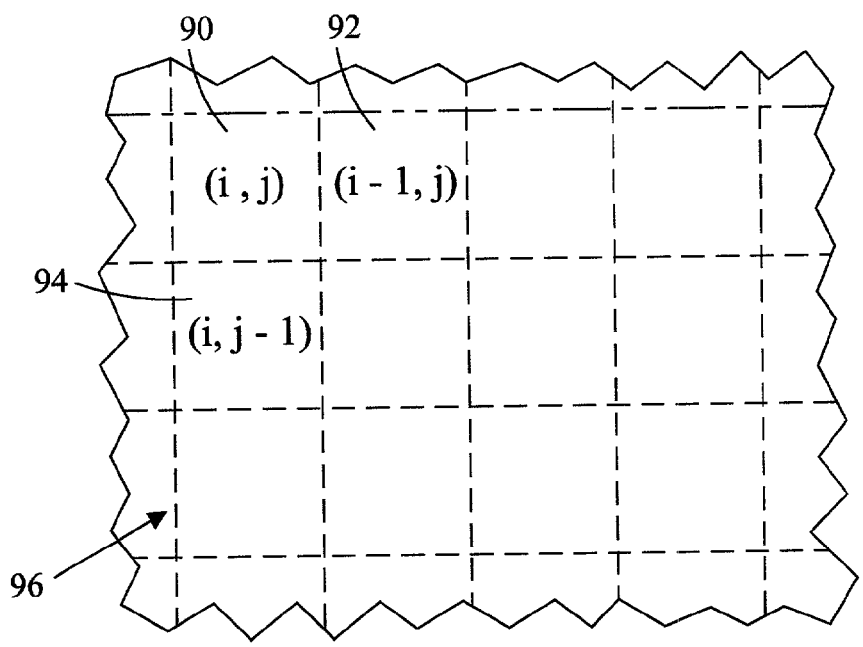
FIG. 4 illustrates pixels of an exemplary sub-image in a portion of an image.

To create a sub-image mask a gradient is determined 44 for each pixel of a sub-image. Referring to FIG. 4, the gradient expresses the relative luminance of a pixel and its neighboring pixels. For example, the gradient can be a two dimensional expression of the difference between the luminance of a pixel 90 and its contiguous horizontal 92 and vertical 94 neighbors:

$$\Delta = (\Delta_V, \Delta_h)$$

$$\Delta_V = |l(i,j) - l(i, j-1)|$$

$$\Delta_h = |l(i,j) - l(i-1, j)|$$

where: $\Delta_V$=the vertical gradient of pixel (i,j)
$\Delta_h$=the horizontal gradient of pixel (i,j)
l(i,j)=the luminance of pixel (i,j)
l(i-1, j)=the luminance a horizontally neighboring pixel
l(i, j-1)=the luminance a vertically neighboring pixel From the set of data representing the gradients of the pixels of a sub-image, a maximum horizontal and vertical gradient is established for the sub-image 46. The maximum sub-image gradient can be expressed as:

$$\Delta_{max} = \max(\Delta_V, \Delta_h)$$

where:

$$\Delta_V = \max |l(i,j) - l(i-1,j)|$$

i=1, B-1
j=0, B-1

$$\Delta_h = \max |l(i,j) - l(i, j-1)|$$

i=0, B-1
j=1, B-1 where: B=the block size ($B_S$ or $B_L$), as appropriate

The maximum sub-image gradient for a sub-image is compared to a gradient threshold 48 for that size of sub-image. If the maximum gradient is less than the threshold, the sub-image is declared to be flat 50. While the gradient threshold may based on a luminance difference, it could be based on other or additional features. For example, the gradient threshold might be based on the luminous separation of the pixels of a pair of pixels exhibiting the maximum gradient; the compactness of luminance values of pixels in a cluster or a relationship between clusters of pixels of spatially neighboring sub-images.

If the maximum gradient of a sub-image is greater than the applicable gradient threshold, two clusters of pixels are initialized 52 for the sub-image. One cluster is centered on the value of the luminance of a first pixel of the pixel pair of maximum gradient for the sub-image and the other on the value of the luminance of the second pixel of the maximum gradient pair. The luminance of each pixel of the image is evaluated relative to the luminance of each of the pixels of the maximum gradient pair for each of the sub-images of which it is a member. Each evaluation pixel is assigned to a cluster of pixels whose center is luminously nearest to the evaluation pixel 54. The Euclidean distance may be used to express the distance between the luminance values of pixels.

The clusters of pixels are assigned to either a foreground or background layer of a sub-image mask 56 produced for each sub-image. For example, a cluster of pixels with a lesser luminance may be assigned to the foreground layer and a cluster with a greater luminance assigned to the background layer. The sub-image layer value of each pixel of a cluster is the layer value (foreground or background) assigned to the cluster of which it is a member.

The final mask is generated by assigning a value to each pixel of the mask layer indicating the appropriate layer (foreground or background) from which the pixel is to be taken in rendering the final image. The mask value is assigned on the basis of a function relating the values of pixels of the sub-image masks for the larger and smaller sub-images of which the pixel is a member 58. While other relationships might be utilized for specific types of documents or to improve results with a particular process, the relationships expressed in the following table have been utilized for generating a final mask.

| Large sub-image | And Small sub-image | Mask Value |
| --- | --- | --- |
| background | mixed | small sub-image |
| foreground | mixed | small sub-image |
| mixed | mixed | small sub-image |
| flat | mixed | small sub-image |
| background | all flat | large sub-image |
| foreground | all flat | large sub-image |
| mixed | all flat | large sub-image |
| flat | flat | background |

The columns headed "large sub-image" and "small sub-image" indicate the sub-image mask value of a substantial portion of the pixels of the corresponding larger or smaller sub-images of which the pixel of interest is a member. The column headed "mask value" indicates that the value of the pixel of interest in the final mask is either the sub-mask value of the pixel for the designated smaller sub-image or larger sub-image or if both the sub-image masks are "flat," the mask value is assigned the background layer value. For example, if a substantial portion of the pixels of the sub-image mask for the larger sub-image are background pixels and the pixels of the sub-image mask for the smaller sub-image are mixed foreground and background, then the final mask value of the pixel is the value of the pixel in the sub-image mask for the smaller sub-image. When the mask value of a pixel has been determined, the method selects the next pixel for evaluation 60. When the final mask value of a pixel has been selected, the spatially corresponding pixel of the designated layer is selected for inclusion in the recomposed image. It is to be understood that other techniques may likewise be used to create a mask layer, foreground layer, and background layer.

The traditional multi-layered image coding approach has been focused on using multiple images and the selection of the appropriate coding technique for each decomposed layer of the image. The traditional approach considers the foreground layer as an image that is to be separately encoded, the background layer as an image that is to be separately encoded, and a mask layer that is likewise separately encoded. In this manner, the most effective image coding technique is used for each layer of the image.

The present inventor considered the potential possibility of adding the mask bit to another one of the images, such as the foreground layer or the background layer. Unfortunately, the mask bits tend to have strong image edges and therefore would result in significant additional edges within the image to which it is added. With additional strong edges added to the foreground image or background image, the image compression techniques, such as JPEG, tend to result in significant undesirable compression artifacts. Accordingly, adding additional bits to the foreground or background image is not generally considered an acceptable technique.

Figure 5:
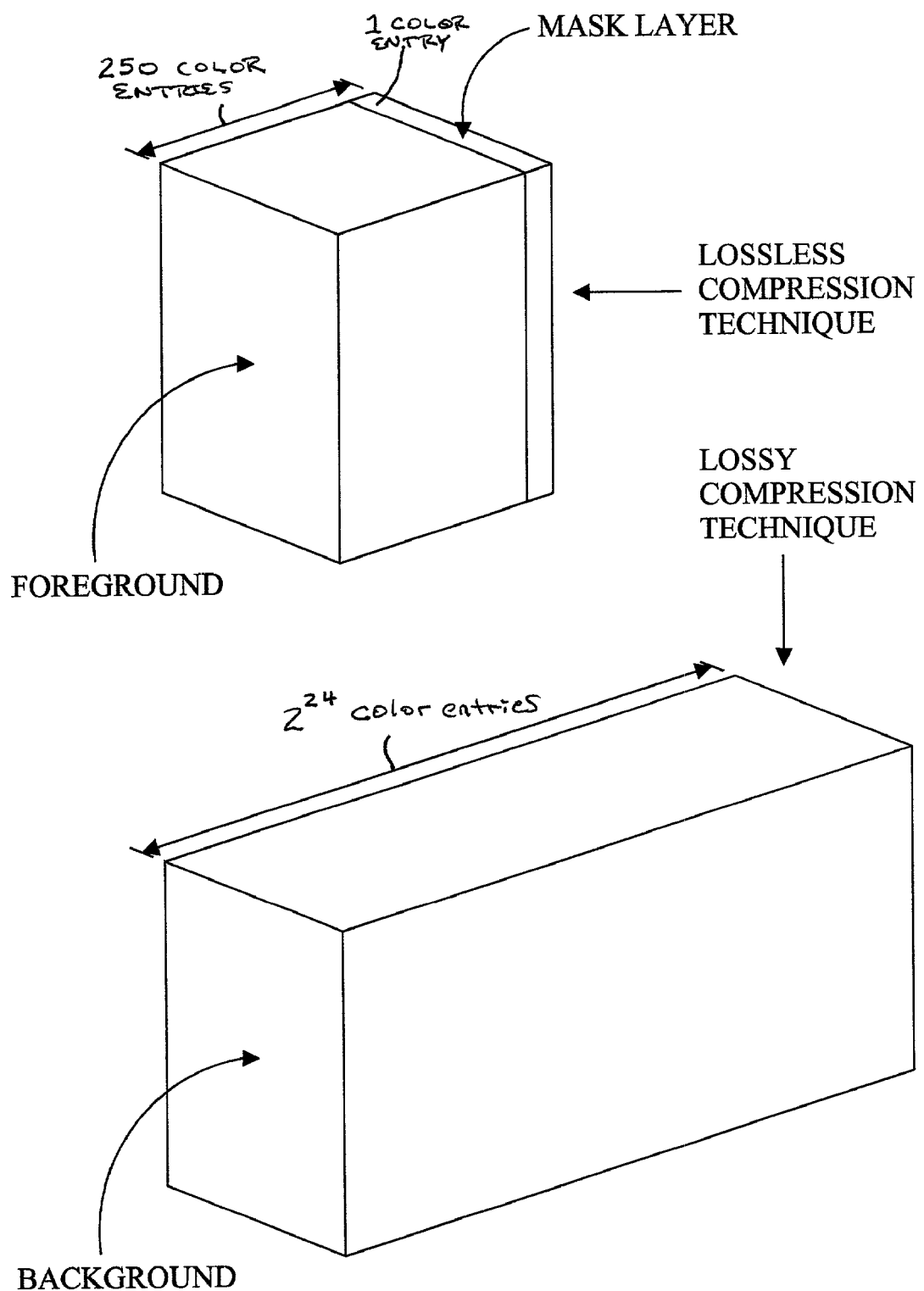
FIG. 5 illustrates a foreground layer and a background layer.

In light of the aforementioned undesirability to add an additional mask bit to the background or foreground images to represent the mask layer, the present inventor then realized that the actual characteristics of the foreground "image" is more accurately an "image" having a color pallet that is less than the original image. For example, the foreground pallet may be 250 colors requiring 8 bits to represent the indices into a color map while the entire image pallet may be considerably larger. In essence, the foreground image may be considered as an 8-bit look up table, where each value corresponds to a different color. With the foreground image having a reduced color pallet the number of bits is less than the original image and typically less than the background image. This reduced color gamut is an appropriate representation for the foreground image, which is normally text or business graphics, and which typically have a limited number of colors. In the particular case that the additional color map entry for the mask layer is added to the foreground layer, it results in a look up table with no additional depth, when an entry is available. If an entry is not available without increasing the number of bits then the entry may be added without an additional bit or the foreground may be more coarsely quantized. Referring to FIG. 5, in the preferred implementation the foreground image is encoded using a lossless compression technique. Using a lossless compression technique on the combination of the foreground image and the mask entry results in the additional edges added to the foreground not adding additional artifacts. Accordingly, by using a lossless compression technique on the foreground image the additional masking entry does not result in undesirable artifacts. With the foreground image and background image created, each may be encoded with a suitable encoding technique, such as a lossless technique for the foreground image, such as JPEG-LS, and a lossy technique for the background image, such as JPEG. Each of the images are accordingly encoded separately. This also avoids the need to support an additional image coding technique for the mask layer. Moreover, the coding efficiency for the "implicit" mask in the foreground image is similar to that for a separate mask layer. Therefore, the overall transmission bit rate to achieve a specified quality should be reduced.

It is to be noted that more than two image layers may be used to represent an image. In addition, the additional data representative of the mask layer may be located within any one or more of the images, though preferably the image with the reduced color pallet. Also, the images may be encoded with any suitable compression technique, though preferably the image(s) with the mask information is losslessly compressed. Also, more than one mask bit may be used.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

What is claimed is:

1. A method of encoding an image comprising:
   (a) defining a first layer;
   (b) defining a second layer;
   (c) modifying said first layer by adding information from a mask layer;
   (d) encoding the modified said first layer; and
   (e) encoding said second layer separate from said encoded modified first layer.

2. The method of claim 1 wherein said first layer has a color gamut less than the color gamut of said image.

3. The method of claim 1 wherein said first layer is a foreground layer.

4. The method of claim 1 wherein said second layer is a background layer.

5. The method of claim 1 wherein said mask layer selects a respective pixel from at least one of said first layer and said second layer.

6. The method of claim 5 wherein said mask layer selects only a single respective pixel from said first layer and said second layer.

7. The method of claim 1 wherein said encoding of step (d) is using a lossless encoding technique.

8. The method of claim 7 wherein said encoding of step (e) is using a lossy encoding technique.

9. The method of claim 1 wherein said first layer is primarily at least one of text and business graphics.

10. The method of claim 1 wherein said second layer is primarily free from text and business graphics.

11. The method of claim 1 wherein said encoding of step (d) and said encoding of step (e) are stored in the same file.

12. A digital image file readable by a computing processor and representative of an image comprising:
    (a) a first encoded portion including a first layer and a mask layer encoded together; and
    (b) a second encoded portion including a second layer.

13. The image file of claim 12 wherein unencoding said first and second encoded portions provides said first layer and said second layer that together with said mask layer are suitable for generating said image.

14. The image file of claim 12 wherein said first layer has a color gamut less than the color gamut of said image.

15. The image file of claim 12 wherein said first layer is a foreground layer.

16. The image file of claim 12 wherein said second layer is a background layer.

17. The image file of claim 12 wherein said mask layer selects a respective pixel from at least one of said first layer and said second layer.

18. The image file of claim 17 wherein said mask layer selects only a single respective pixel from said first layer and said second layer.

19. The image file of claim 12 wherein said encoding of step (a) is using a lossless encoding technique.

20. The image file of claim 19 wherein said encoding of step (b) is using a lossy encoding technique.

21. The image file of claim 12 wherein said first layer is primarily at least one of text and business graphics.

22. The image file of claim 12 wherein said second layer is primarily free from text and business graphics.

23. The image file of claim 12 wherein said encoding of step (a) and said encoding of step (b) are stored in the same file.

\* \* \* \* \*

UNITED STATES PATENT AND TRADEMARK OFFICE
CERTIFICATE OF CORRECTION

| | | |
|---|---|---|
| PATENT NO. | : 7,065,254 B2 | Page 1 of 1 |
| APPLICATION NO. | : 09/952644 | |
| DATED | : June 20, 2006 | |
| INVENTOR(S) | : Kristine E. Matthews | |

It is certified that error appears in the above-identified patent and that said Letters Patent is hereby corrected as shown below:

<u>Column 2, line 17</u>
Change "… is method of..." to --...is a method of…--

<u>Column 3, line 36</u>
Change "...the luminance a…" to --...the luminance of a…--

<u>Column 3, line 38</u>
Change "...the luminance a vertically..." to --...the luminance of a vertically…--

<u>Column 3, line 59</u>
Change "threshold may based…" to --threshold may be based…--

Signed and Sealed this

Fifth Day of December, 2006

JON W. DUDAS
*Director of the United States Patent and Trademark Office*